C. S. COLLINS.
Ash-Sifters.
No. 136,902.  Patented March 18, 1873.
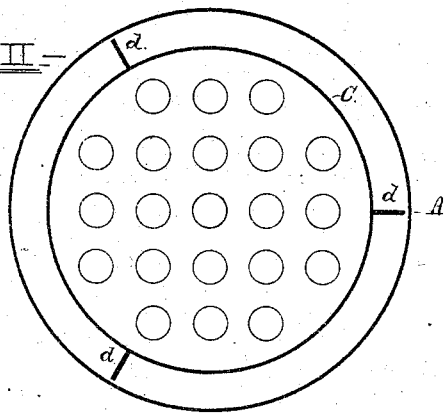
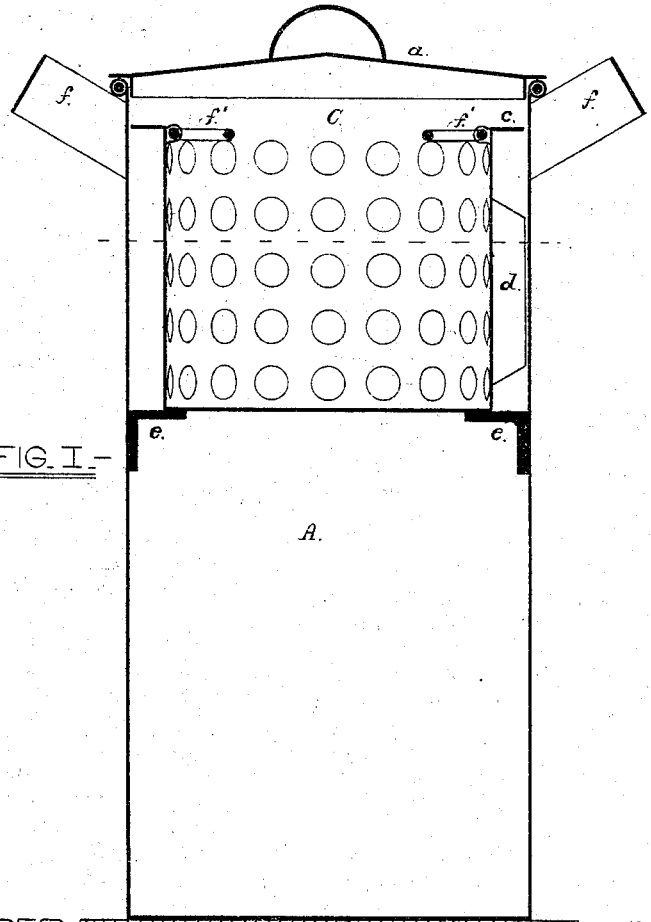
WITNESSES.
Joseph Bragg
Woodruff W. Wharton
INVENTOR
Charles S. Collins
by G. H. & W. T. Howard
att'ys
AM. PHOTO-LITHOGRAPHIC CO. N.Y. (OSBORNE'S PROCESS.)

UNITED STATES PATENT OFFICE.

CHARLES S. COLLINS, OF BALTIMORE, MARYLAND, ASSIGNOR OF ONE-HALF HIS RIGHT TO JOHN T. FLEEHEARTY, OF SAME PLACE.

IMPROVEMENT IN ASH-SIFTERS.

Specification forming part of Letters Patent No. 136,902, dated March 18, 1873.

*To all whom it may concern:*

Be it known that I, CHARLES S. COLLINS, of the city of Baltimore and State of Maryland, have invented certain Improvements in Ash-Sifting Buckets, of which the following is a specification; and I do hereby declare that in the same is contained a full, clear, and exact description of my said invention, reference being had to the accompanying drawing and to the letters of reference marked thereon.

My invention relates to a bucket or vessel, preferably cylindrical in form, and constructed of sheet metal, placed upon rockers and supplied with a lid or cover, within which vessel is fitted an ash-receptacle, conforming to it in shape, but smaller in diameter or width and depth. This ash-receptacle may be formed of wire or sheet metal, and, if cylindrical, is a sieve having its circumference and bottom in open wire-work or perforated, or, if of polygonal cross-section, having its various sides and bottom in open-work. The ash-receptacle rests upon brackets riveted or secured to the interior of the exterior vessel, and is provided, for a purpose hereinafter explained, with a flanch at its upper edge fitting closely to the interior surface of the said exterior vessel. The said ash-receptacle is also furnished with several plates or wings of sheet metal, secured to the exterior of its circumference or sides, fitting closely to the interior surface of said exterior vessel, for a purpose hereinafter explained.

In the accompanying drawing forming a part of this specification, Figure 1 represents a vertical section of my invention, and Fig. 2 a cross-section of the same.

Similar letters of reference indicate similar parts of the invention in both the views.

A is the exterior vessel, of which $a$ is the cover or lid. The vessel rests upon and is secured to rockers B. C is the ash-receptacle, having a diameter smaller than that of the vessel A, and its circumference and bottom perforated or in open wire-work. The upper flanch $c$, and also the plates or wings $d$, fit closely to the interior surface of the vessel A, serving to keep the receptacle or sieve C centrally of the vessel A, and to prevent the bulging of the sieve laterally by the action of the mass of cinders and ashes placed therein. The brackets $e$ form the support of the ash-receptacle, and are placed at such a height from the bottom of the vessel A as will leave sufficient space between that point and the bottom of the said receptacle for the occupancy of the ashes sifted therefrom. The vessel A and the ash-receptacle are provided with handles $f$ and $f'$ for obvious purposes.

The ashes are sifted from the receptacle in which they are placed by the oscillatory movement upon the rockers given to the vessel A by the operator.

The purpose of my invention is to give to the sieve a greater perforated or open wire-worked surface than is found in sieves and sifting-buckets ordinarily used, thereby adding to the efficiency of such devices, and to make a convenient, tidy, and cheap utensil for household use.

Having described my invention, what I claim as new, and wish to secure by Letters Patent of the United States, is—

The covered vessel A, placed upon rockers, the smaller ash-receptacle C having its bottom and circumference perforated or in open wire-work, flanch $c$, plates or wings $d$, and supporting-brackets $e$, relatively arranged substantially as and for the purpose herein specified.

In testimony whereof I have hereto subscribed my name, in the city of Baltimore, this 5th day of February, in the year of our Lord 1873.

CHAS. S. COLLINS.

Witnesses:
THOMAS MURDOCH,
WM. T. HOWARD.